United States Patent
Czerwiec et al.

(10) Patent No.: US 6,847,702 B1
(45) Date of Patent: Jan. 25, 2005

(54) SYSTEMS AND METHODS FOR ENHANCED RELIABILITY IN A COMMUNICATION SYSTEM

(75) Inventors: Richard Marion Czerwiec, Raleigh, NC (US); Marlin Vaughn Simmering, Clayton, NC (US); Geert Van Wonterghem, Eeklo (BE)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/476,799

(22) Filed: Dec. 30, 1999

Related U.S. Application Data (60) Provisional application No. 60/136,445, filed on May 28, 1999.

(51) Int. Cl.[7] ............ H04M 1/24; H04M 3/08; H04M 3/22
(52) U.S. Cl. ............ 379/29.01; 379/399.01; 379/399.02; 379/9.06
(58) Field of Search .......... 379/9.06, 399.01, 379/399.02, 27.06, 413.02, 16, 22.04, 26.01, 27.01, 27.02, 27.03, 28, 29.03–29.04, 29.11

(56) References Cited

U.S. PATENT DOCUMENTS

| | | | | |
|---|---|---|---|---|
| 4,581,493 A | * | 4/1986 | Gazzo et al. | 379/12 |
| 4,611,320 A | * | 9/1986 | Southard | 370/241 |
| 5,274,692 A | * | 12/1993 | Lechner et al. | 379/29.08 |
| 5,301,050 A | | 4/1994 | Czerwiec et al. | |
| 5,361,293 A | | 11/1994 | Czerwiec et al. | |
| 5,471,517 A | * | 11/1995 | Nakagawa | 379/29.01 |
| 5,790,550 A | | 8/1998 | Peeters et al. | |

FOREIGN PATENT DOCUMENTS

EP  0858035 A1  8/1998

* cited by examiner

*Primary Examiner*—Duc Nguyen
(74) *Attorney, Agent, or Firm*—Kile, McIntyre & Harbin; Craig A. Hoersten; V. Lawrence Sewell

(57) ABSTRACT

Disclosed are systems and methods for transferring data between servers and subscribers. A central office employs DSL circuit cards. Each DSL circuit card encodes a digital signal using a discreet multitone technology (DMT) scheme, and sends an encoded signal on a subscriber line. A disclosed architecture allows the functions of a faulty DSL circuit card to be assumed by another card, without substantial disruption of subscriber service. Further, the architecture allows the faulty DSL to be physically replaced, with minimal disruption of subscriber service. Another aspect of the architecture allows for the testing of subscriber lines.

5 Claims, 7 Drawing Sheets

300
SYSTEMS AND METHODS FOR ENHANCED RELIABILITY IN A COMMUNICATION SYSTEM

This Application claims the benefit of Application Ser. No. 60/136,445 filed May 28, 1999 for SPARE LINE SWITCHING APPARATUS AND METHOD, the contents of which are herein incorporated by reference.

BACKGROUND OF THE INVENTION

1. Field of the Invention

This invention relates generally to the field of telecommunications and, more particularly, to a system and method of enhancing reliability while providing communication services to multiple subscribers.

2. Description of Related Art

Communication technology has had steady progress in functionality and speed, especially since the advent of the global Internet. A typical architecture includes a so called central office that transfers data between multiple servers and multiple subscribers. Hardware failure, however, may interrupt service to one or more subscribers.

SUMMARY OF THE INVENTION

It is an object of the present invention to provide a system and method for enhancing reliability in a communication system.

To achieve this and other objects of the present invention, there is a method in a system including a first generator that generates a first signal, a second generator that generates a second signal, and a conductor. The method comprises reading a portion of the first signal and processing the first signal in a first circuit; receiving the first signal from the first circuit; mixing the first signal, received in the previous step, with the second signal to send a third signal on the conductor; subsequently, reading a portion of the first signal and processing the first signal in a second circuit; receiving the first signal from the second circuit; and mixing the first signal, received in the previous step, with the second signal to send the third signal on the conductor.

According to another aspect of the present invention, there is a processing system for a first system including a conductor. The processing system comprises a first generator that generates a first signal; a second generator that generates a second signal; a first circuit configured to read a portion of the first signal and process the first signal; a second circuit configured to read a portion of the first signal and process the first signal; a third circuit configured to mix the first signal, from the first circuit, with the second signal to send a third signal on the conductor, or to mix the first signal, from the second circuit, with the second signal to send a third signal on the conductor.

According to yet another aspect of the present invention, there is a processing system for a first system including a conductor. The processing system comprises a first generator that generates a first signal; a second generator that generates a second signal; means for reading a portion of the first signal and processing the first signal in a first circuit; means for receiving the first signal from the first circuit; means for mixing the first signal, received by the previous means, with the second signal to send a third signal on the conductor; means for subsequently, reading a portion of the fist signal and processing the first signal in a second circuit; means for receiving the first signal from the second circuit; and means for mixing the first signal, received in the previous step, with the second signal to send a third signal on the conductor.

According to yet another aspect of the present invention, there is a method for a system including a plurality of encoders each for receiving a digital signal to generate a respective encoded signal, a generator for generating a test signal, a plurality of cards each coupled to a respective conductor for sending signals to a respective subscriber. The method comprises the step, performed in each card, of maintaining a first current path between a respective encoder and the respective conductor, to transfer the encoded signal from the encoder to a respective subscriber, and the following subsequent steps, performed in one of the cards, of breaking the first current path; making a second current path between the generator and the respective conductor, to transfer the test signal from the generator to the conductor, and the following step, performed currently with the two previous steps, in remaining ones of the cards, of maintaining the first current path between the respective encoder and the respective conductor, to transfer the respective encoded signal from the encoder to the respective subscriber.

According to yet another aspect of the present invention, there is a method for a system including a plurality of encoders for receiving a digital signal to generate a plurality of respective encoded signals, a generator for generating a test signal, a plurality of cards each coupled to a plurality of respective conductor for sending signals to a plurality of respective subscribers. The method comprises the step, performed in each card, of maintaining first current paths between a respective encoder and the respective conductors, to transfer the encoded signals from the encoder to the respective subscribers, and the following subsequent steps, performed in one of the cards, of breaking one of the first current paths; making a second current path between the generator and one of the respective conductors, to transfer the test signal from the generator to the one of the respective conductors, and the following step, performed in remaining ones of the cards currently with the two previous steps, of maintaining the first current paths between the respective encoder and the respective conductors, to transfer the encoded signals from the encoder to the respective subscribers.

According to yet another aspect of the present invention, there is a processing system for a first system having a plurality of conductors and a plurality of subscribers. The processing system comprises a plurality of encoders each for receiving a digital signal to generate a respective encoded signal; a generator for generating a test signal; a plurality of cards each coupled to a respective conductor for sending signals to a respective subscriber, each card including a current switch for maintaining a first current path between a respective encoder and the respective conductor, to transfer the encoded signal from the encoder to a respective subscriber, and for making a second current path between the generator and the respective conductor, to transfer the test signal from the generator to the conductor.

According to yet another aspect of the present invention, there is a processing system for a first system having a plurality of conductors and a plurality of subscribers. The processing system comprises a plurality of encoders for receiving a digital signal to generate a plurality of respective encoded signals; a generator for generating a test signal; a plurality of cards each coupled to a plurality of respective conductor for sending signals to a plurality of respective subscribers; means for maintaining first current paths between a respective encoder and the respective conductors, to transfer the encoded signals from the encoder to the respective subscribers; means, activated in one of the cards, for making a second current path between the generator and one of the respective conductors, to transfer the test signal from the generator to the one of the respective conductors; and means, activated in remaining ones of the cards, for maintaining the first current paths between the respective encoder and the respective conductors, to transfer the encoded signals from the encoder to the respective subscribers.

According to yet another aspect of the present invention, there is a processing system for a first system having a plurality of conductors and a plurality of subscribers. The processing system comprises a plurality of encoders each for receiving a digital signal to generate a respective encoded signal; a generator for generating a test signal; a plurality of cards each coupled to a respective conductor for sending signals to a respective subscriber; means, activatable for each card, for maintaining a first current path between a respective encoder and the respective conductor, to transfer the encoded signal from the encoder to a respective subscriber; means for making, activated in one of the card, a second current path between the generator and the respective conductor, to transfer the test signal from the generator to the conductor; means for maintaining, activated in remaining ones of the cards, the first current path between the respective encoder and the respective conductor, to transfer the respective encoded signal from the encoder to the respective subscriber.

According to yet another aspect of the present invention, there is a processing system for a first system having a plurality of conductors and a plurality of subscribers. The processing system comprises a plurality of encoders for receiving a digital signal to generate a plurality of respective encoded signals; a generator for generating a test signal; a plurality of cards each coupled to a plurality of respective conductor for sending signals to a plurality of respective subscribers, each card associated with a current switch for maintaining first current paths between a respective encoder and the respective conductors, to transfer the encoded signals from the encoder to the respective subscribers, and for making a second current path between the generator and one of the respective conductors, to transfer the test signal from the generator to the one of the respective conductors.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

Figure 1:
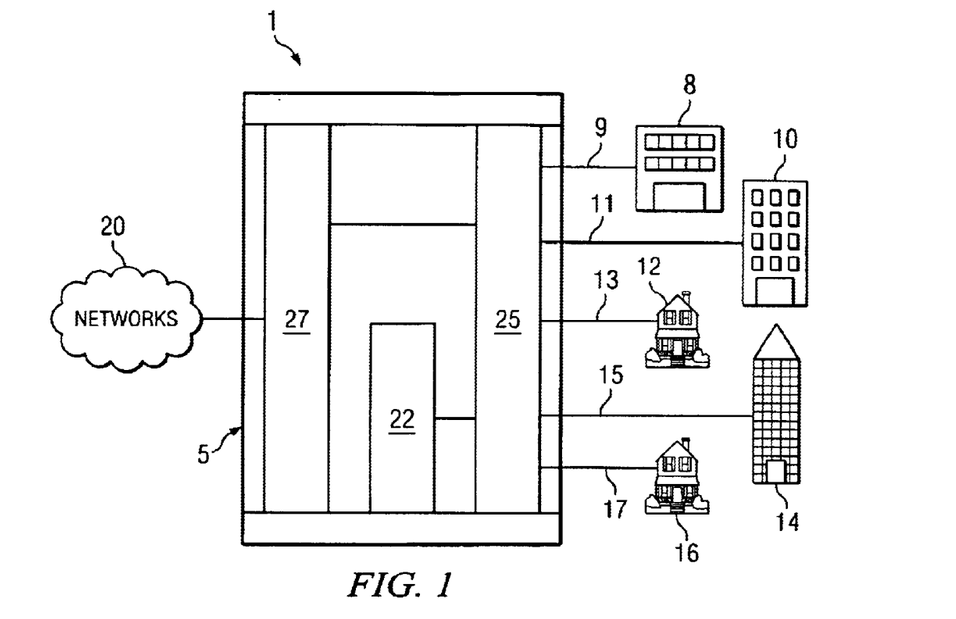
FIG. 1 is diagram of a communication system in accordance with a first preferred embodiment of the present invention.

FIG. 1 shows system 1 in accordance with a preferred embodiment of the present invention. System 1 includes central office 5 managed by a telephone company or other type of communication provider. Central office 5 provides communication services to a plurality of subscribers, in office building 8, 10, and 14; and homes 12 and 16. Central office 5 provides communication services to the subscribers via respective subscriber lines 9, 11, 13, 15, and 17. Each subscriber line is a tip and ring twisted pair, including 2 copper wires constituting 2 contiguous current paths between central office 5 and the building of a subscriber.

Central office 5 includes access circuitry 25, telephone switch 22, and interface 27 to a wide area network (WAN) communication link 28 to service provider networks 20 in the global Internet. In this Patent Application, the word circuitry encompasses both dedicated hardware and programmable hardware, such as a CPU or reconfigurable logic array, in combination with programming data, such as sequentially fetched CPU instructions or programming data for a reconfigurable array.

Access circuitry 25 acts to combine data from networks 20 with an analog, voice band, signal from telephone switch 22, to send a composite signal to subscribers via the subscriber lines. For example, circuitry 25 receives and encodes data from networks 20 to generate a discreet multitone technology (DMT) signal, combines the DMT signal with an analog signal from telephone switch 22, and sends the composite signal over line 11 to a subscriber in office building 10. Conversely, circuitry 25 receives a composite signal from the subscriber in building 10 via line 11, filters the composite signal to send a digital signal to networks 20, and filters the composite signal to send an analog signal to telephone switch 22. The exemplary system 1 ADSL (Asymmetric Digital Subscriber Line) and is optimized for SONET (Synchronous Optical NETwork) OC3 technologies and standards. Those skilled in the art will understand that the basic architecture of system 1 is applicable to many other technologies and standards.

Figure 2:
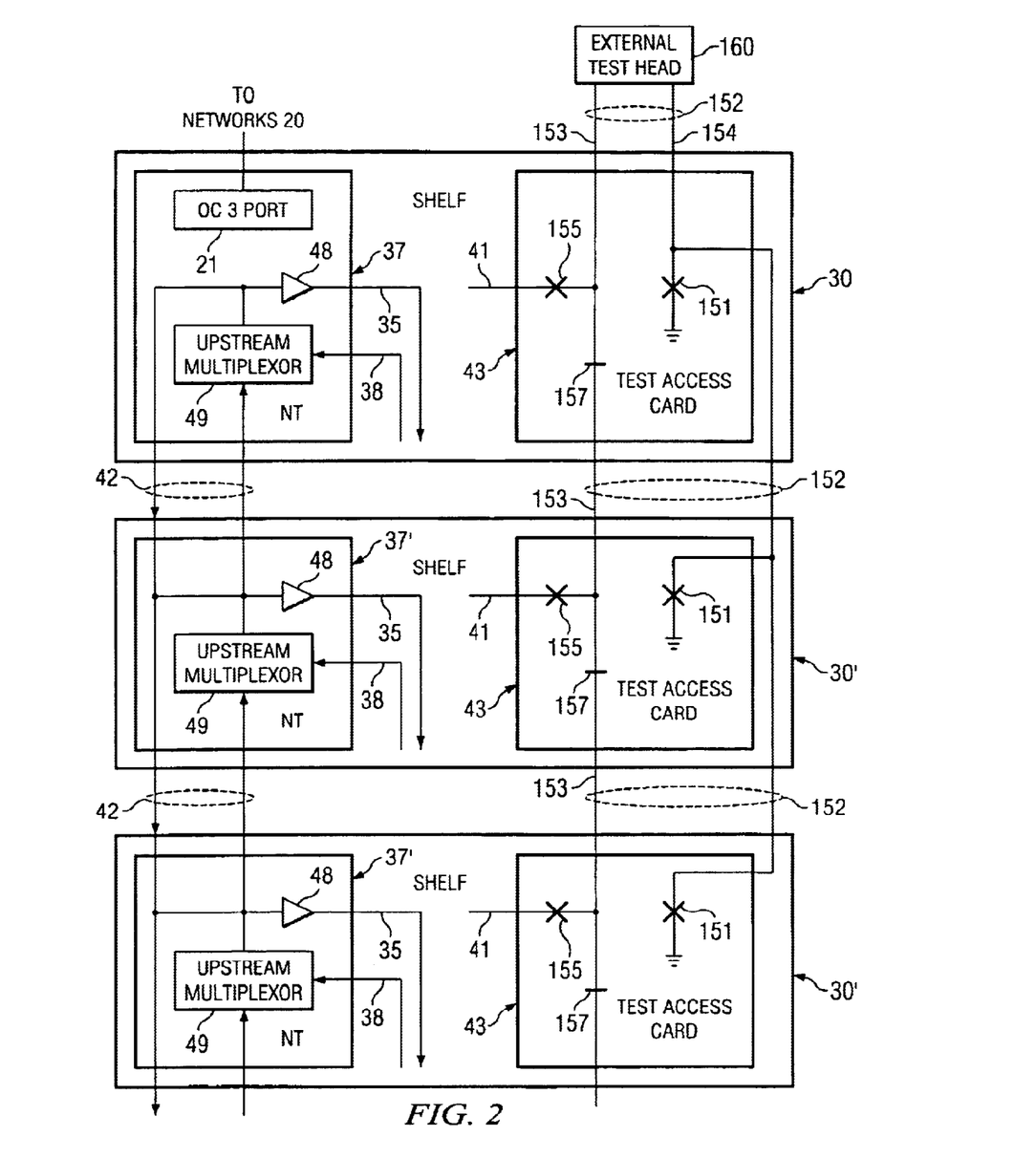
FIG. 2 is a diagram showing a connection of shelves in the first preferred system.

FIG. 2 shows a plurality of a first shelf 30 connected to a plurality of shelves 30' via daisy chain cables 42. Shelves 30 and 30' house access circuitry 25 in central office 5. Network Termination (NT) card 37 includes a SONET OC3 port 21. NT extender cards 37' include all of the circuitry of NT card 37, described later in this Patent Application, except for OC3 port 21.

Signal buffers 48 and ATM switching circuitry sends ATM cells to other circuitry in shelves 30 and 30', via downstream busses 35 or downstream busses 31. Upstream multiplexors 49 receive ATM cells from other circuitry in shelves 30 and 30', via upstream busses 38 or upstream busses 39.

Shelf 30 is connected to shelves 30' via test cable 152. Cable 152 includes a wire pair 153 with a wire for tip and a wire for ring. Cable 152 also includes a connection signal wire 154 to convey a battery ground signal to external test head 160, to indicate to test head 160 that a connection is complete and testing can commence. Thus, the chain test access connection includes a 3 pin configuration—tip, ring and "test connection complete" signal (sleeve), allowing automation of external test equipment with multiple systems.

Each shelf includes a local bus 41 used for both testing and for spare card switching, as described in more detail below. Local bus 41 includes 12 wire pairs, each of the 12 pair individually connectable to wire pair 153 and test cable 152, via relays 155 on test access card 143. When a test access card 143 closes one of relays 155 to allow test signals to pass between test head 160 and a pair of wires on local bus 41, the test access card 43 closes relays 157 to disconnect the remainder of the daisy chain for performance enhancement.

It is presently preferred that the open circuit voltage, provided by external test head 160 to test access card 43, be no more than −80 VDC, while the battery ground signal provided by test access card 43 assumes a current draw of no more than 100 ma, and the voltage provided by test access card 43 in the presence of this current not exceed 1 VDC.

Relays that are normally open are denoted with "X" as shown, for example, at relays 155 in FIG. 2. Relays that are normally closed are denoted with "______" as shown, for example at relays 157 in FIG. 2.

Figure 3:
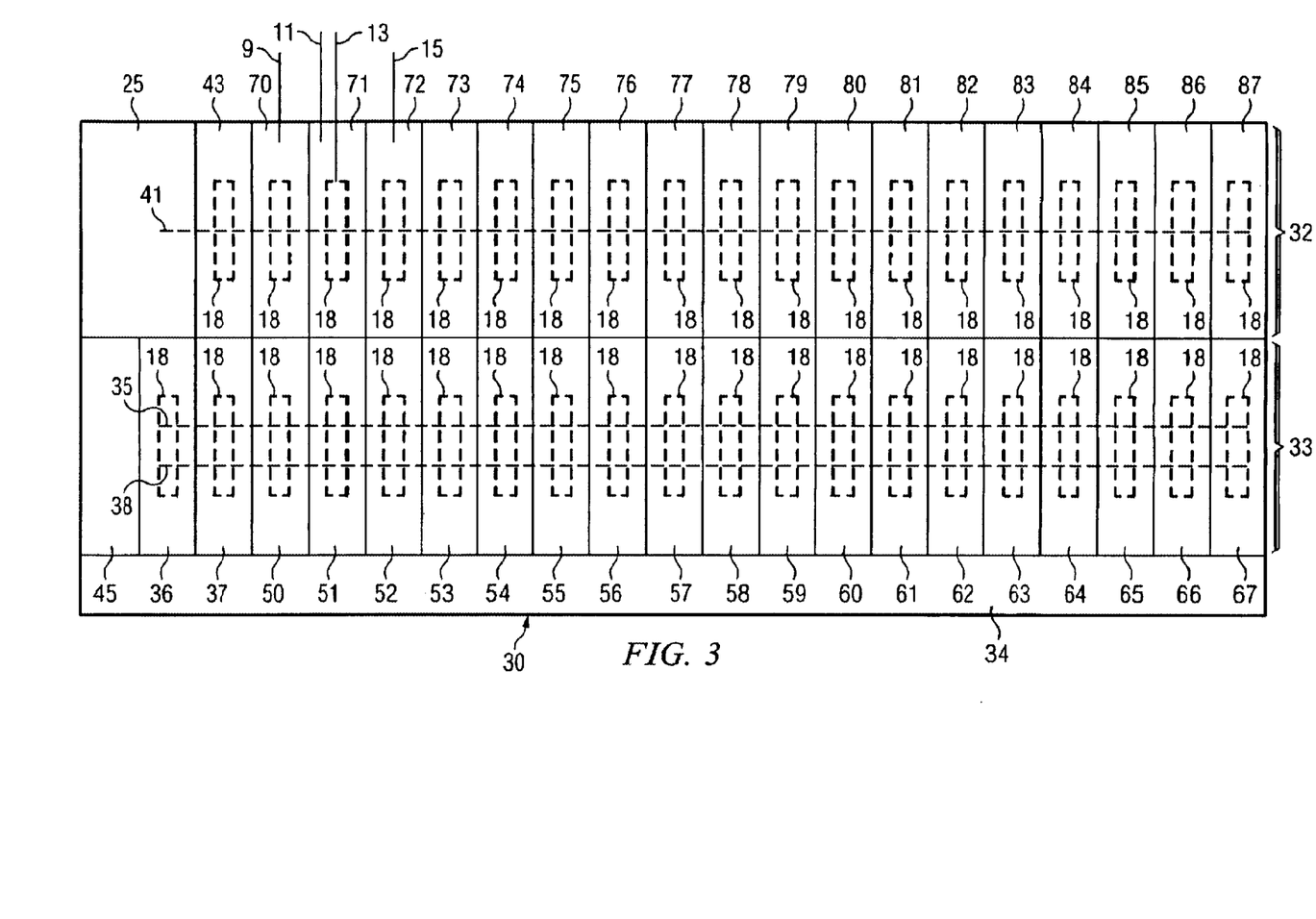
FIG. 3 is a view of a shelf with plug-in circuit cards in the preferred system.

FIG. 3 shows high density shelf 30 supporting access circuitry 25 in central office 5. Shelf 30 is a rear access module with 2 tiers of card slots. Upper tier 32 houses upper tier cards (UTs) 70–87. Lower tier 33 houses line termination cards 50–67 (LTs) for communication with subscribers. Network termination cards 36 and 37 (NTs) interface with circuitry 27 leading to networks 20. Alarm-craft interface card 45 collects alarm information from circuitry 25, displays the alarm information locally, and sends the alarm information to other systems. Shelf 30 can accommodate either 1 or 2 NTs, depending on whether redundancy is required, and up to 18 LTs. Each LT includes 12 subscriber lines. Thus, with 18 LTs×12 lines/LT, shelf 30 interfaces to 216 subscriber lines.

Shelf 30 is essentially a mechanical backplane mechanically supporting signal busses 41, 35 and 38. As discussed in connection with FIG. 2 above, bus 41 includes 12 pairs of wires. Each of busses 35 and 38, includes a plurality of parallel data lines and a plurality of control lines.

Figures 4, 5:
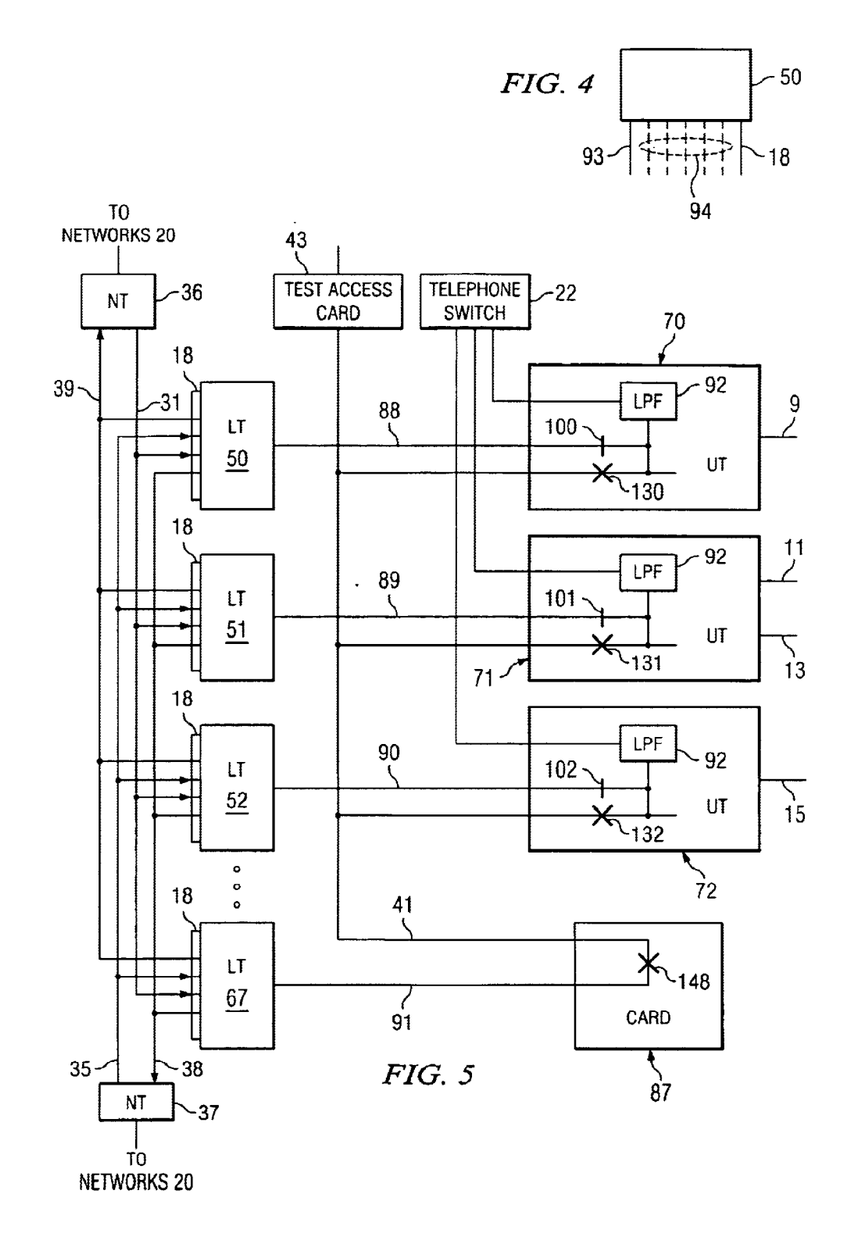
FIG. 4 is a diagram showing a backplane connector for plugging a circuit card into the backplane of a shelf.
FIG. 5 is a block diagram showing some circuitry in the shelf shown in FIG. 2.

Each of cards 36, 37, 45, 50–67, and 70–87 connects to the mechanical backplane via a respective backplane connector 18, such as connector 18 of card 50 shown in FIGS. 3 and 4. Each backplane connector 18 includes a plastic, insulating housing 93 enclosing and supporting a plurality of parallel conductors 94 for sending signals between a card and the backplane. The conductors inside connector 18 of each of cards 43 and 70–87 allow the card to transfer signals between itself and local bus 41. For each of cards 37 and 50–67, the conductors are for sending signals between the card and busses 35, and 38. For example, the conductors inside connector 18 of NT card 37 allow card 37 to send signals to downstream busses 35 and receive signals from upstream busses 38. The conductors in connector 18 of LT card 51 allow LT card 51 to receive signals from busses 35 and busses 31, and to send signals to busses 38 and busses 39.

Each of cards 36, 37, 45, 50–67, and 70–87 is removably connected to the mechanical backplane.

FIG. 5 is a block diagram emphasizing some signal paths in the preferred system. In the example immediately following, NT 37 is a SONET OC3 in an active mode and NT 36 is a SONET OC3 in a standby mode. Referring to FIGS. 3 and 5, each LT has an associated upper tier card (UT) in the slot directly above the LT. For example, bus 88 includes 12 pairs of conductors, a pair for each subscriber, between LT 50 and UT 70. Bus 89 includes 12 pairs of conductors between LT 51 and UT 71. Bus 90 includes 12 pairs of conductors between LT 52 and UT 72. Bus 91 includes 12 pairs of conductors between LT 53 and UT 73.

A UT includes any filtering circuitry provided to the subscriber lines. For example, each upper tier card (UT) includes a respective low pass filters (LPF) 92 between the subscriber lines and telephone switch 22.

NT 37 receives Asynchronous Transfer Mode (ATM) cells from interface 27 and sends the cells over downstream busses 35. Each ATM cell includes a pair of identifiers: a Virtual Path Identifier (VPI) and a Virtual Channel Identifier (VCI). Each LT recognizes a set of VPI/VCI pairs (addresses) as identifying a cell destined for one or more subscribers connected to the LT. For example, LT 52 recognizes a set of 1 or more VPI/VCI addresses as identifying a cell destined for a subscriber in building 14. Upon recognizing such a cell, LT 52 generates a DMT signal encoding the cell, and sends the signal to UT 72. UT 72 combines the DMT signal with an analog signal from telephone switch 22, to send a composite signal to the subscriber in building 14, via line 15.

Thus, a VPI/VCI address acts as a type of routing signal.

When a subscriber wishes to send data to service provider networks 20, the subscriber modem encodes the data in a DMT signal and sends the DMT signal over, a subscriber line. This DMT signal passes from one of the UTs, to a high pass filter in an LT car, to send a digital signal to NT 37 via one of upstream busses 38.

Thus, NT card 37, downstream busses 35, and upstream busses 38 act to provide the subscribers with access to service provider networks 20. During this time, NT card 36, 9 downstream busses 31, and upstream busses 39 are redundant. In other words, NT card 36, downstream busses 31, and upstream busses 39 are in a standby mode in case NT 37, busses 35, or busses 38 should malfunction. Systems and methods of detecting silent failures in standby NT card 36, and standby busses 31 and 39, are disclosed U.S. patent application Ser. No. 09/450,714 by RICHARD M. CZERWIEC, JAN DE GROOTE, RICHARD R. RZONCA, MARLIN V. SIMMERING, and GEERT VAN WONTERGHEM filed Nov. 30, 1999 for COMMUNICATION SYSTEM HAVING ENHANCED RELIABILITY, the contents of which is herein incorporated by reference.

Referring to FIGS. 3 and 5, each LT has an associated UT in the slot directly above the LT. The UT includes any filtering circuitry provided to the lines. For example, bus 88 includes 12 pairs of conductors, a pair for each subscriber, between LT 50 and UT 70. Bus 89 includes 12 pairs of conductors between LT 51 and UT 71. Bus 90 includes 12 pairs of conductors between LT 52 and UT 72. The UT card also includes a connection to local bus 41 via relays, such as relays 132. Under normal conditions, relays 132 are open, with normal signal flow between the LT 52 and a subscriber at the end of line 15 via UT 72 card. If a fault condition is detected on LT 52, however, NT 37 opens relays 102, closes relays 132, and closes relays 148.

If a fault condition is detected on LT 52, NT 37 also instructs LT 67 to recognize the set of VPI/VCI pairs for the subscribers connected to UT 72. More specifically, NT 37 sends the set of VPI/VCI pairs, to be recognized by LT 67, via an operations channel on downstream 35. This operations channel is a stream of ATM cells having a VPI/VCI pair assigned to LT 67 itself. When LT 67 sees an ATM cell with the VPI/VCI of LT 67 itself, LT 67 interprets the remainder of the cell as a command from NT 37. One such command is to recognize a new VPI/VCI as belonging to the subscriber to be associated with LT 67. Thus, NT 37 reroutes the subscriber ADSL traffic to Spare LT 67.

In other words, NT 37 has access to a cross connect database, which is effectively a respective list of VPI/VCI pairs for each subscriber line associated with each LT. When a faulty LT is detected, NT 37 sends a portion of the cross connect database, that was relevant to the faulty LT, to spare LT 67.

The faulty LT 52 is effectively bypassed, service is promptly restored, and faulty LT 52 can be removed physically with no effect on service.

With the processing above, upon determining that a fault on a specific LT is denying service to a subscriber, the relays in the LT's associated UT card disconnect the faulty LT from the connection while the relays in spare line switching card 87 close, allowing he Spare LT to continue service. All 12 subscriber lines attached to the faulty LT are switched to spare LT allowing replacement to the faulty LT. All 12 subscribers are switched to spare LT 67, even if the fault on the defective LT only affects a single subscriber. Both subscribers with interrupted service and subscribers with operating service are switched to the LT. More specifically, NT 37 opens all 12 pairs of relays 102, closes all 12 pairs of relays 132, and closes all 12 pairs of relays 148.

In summary, LT 52, for example, acts to read the VPI/VCI portions of the ATM cell stream from NT 37, and to process selected portions of this cell stream. The selected portions are the payloads of cells having VPI/VCI values corresponding to subscribers connected to UT 72. Because relays 102 of UT 72 are initially closed, UT 72 receives the ATM cell stream from LT 52, and essentially mixes the ATM cell stream from LT 52 with a certain voice band signal from telephone switch 22. Subsequently, after detecting a fault in LT 52, for example, NT 37 sends a portion of the cross connect database, the portion VPI/VCI values corresponding to subscribers connected to UT 72, to LT 67. The preferred system opens relays 102, closes relays 132, and closes relays 148. Consequently, LT 67, acts to read the VPI/VCI portions of the ATM cell stream from NT 37, and to process selected portions of this cell stream, the selected portions being the payloads of cells having VPI/VCI values corresponding to subscribers connected to UT 72. Because relays 102 are now open, and relays 132 and 148 are now closed, UT 72 receives the ATM cell stream from LT 67, and essentially mixes the ATM cell stream from LT 67 with the certain voice band signal from telephone switch 22.

If external test access is also desired, such access can be effected by the inclusion of test access card 43.

For test access, a subscriber line to be tested is accessed by operating the appropriate relay in an UT card, and the appropriate relay in test access card 43, allowing the subscriber line to be tested in the appropriate DSL frequency spectrum via an external test head 160. Bus 41 is used for both spare line switching and test bus access.

For test access, subscriber lines are tested individually as a trouble diagnostic, or at installation. All 12 wire pairs of bus 41 have access to a daisy chained test access bus 153. A single relay on the UT is operated, connecting a subscriber drop to a pair of wires in local bus 41, while a relay in test access card 43 connects the pair of wires to test head 160, via bus 153. For test, there are no relay operations on spare line switching card 67.

Figure 6:
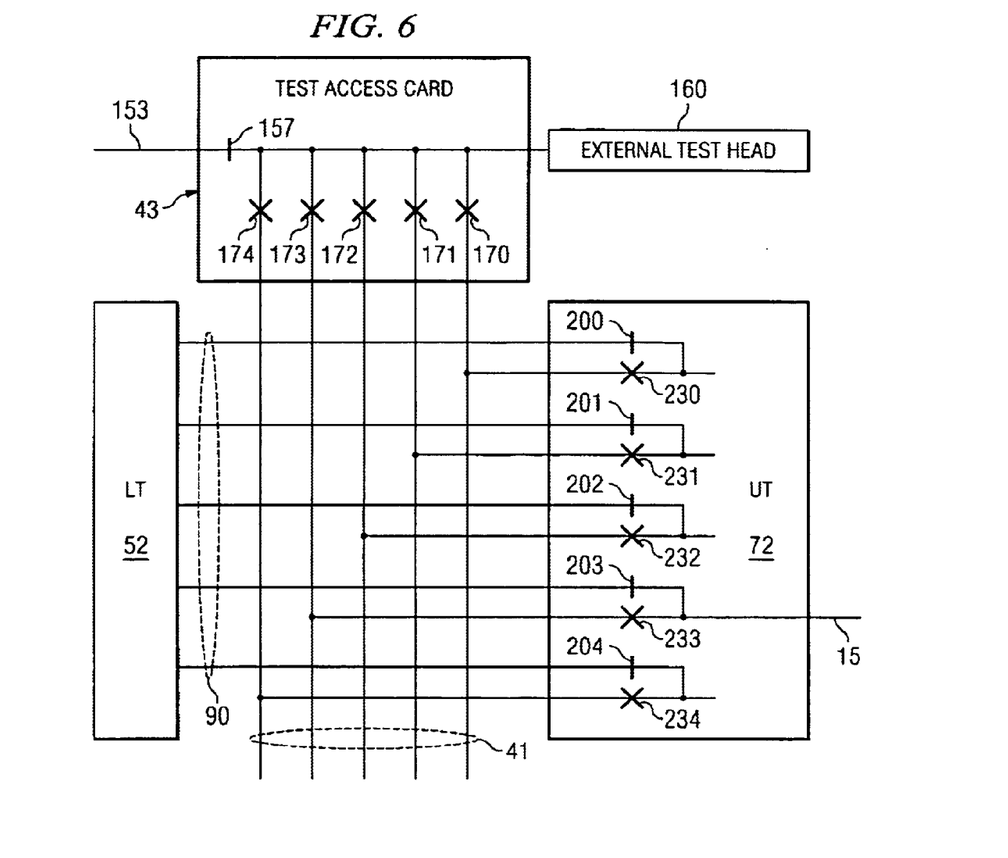
FIG. 6 is a diagram emphasizing some of the circuitry shown in FIG. 5.

FIG. 6 is a diagram emphasizing some of the signal paths shown in FIG. 5. FIG. 6 emphasizes five of the twelve subscriber lines of UT 72, and five of the 12 lines (12 wire pairs) of bus 41. Relays 155, described above in connection with FIG. 2, include relays 170, 171, 172, 173, and 174. Relays 102, describe above in connection with FIG. 5, include relays 200, 201, 202, 203, and 204. Relays 132, describe above in connection with FIG. 5, include relays 230, 231, 232, 233, and 234.

To test subscriber line 15, for example, LT 52 commands UT 72 to close relay 233, open relay 203, while maintaining each of relays 230, 231, 232, and 234 open, and maintaining each of relays 200, 201, 202, and 204 closed. To complete the connection between line 15 and bus 153, the preferred system commands test access card 43 to close relay 173, while maintaining relays 170, 171, 172, and 174 open.

NT 37 also commands test access card 43 to open relay 157 to enhance performance by eliminating excess load.

In summary, LT 50–66 essentially act as a plurality of encoders each for receiving an ATM cell stream to generate a respective encoded ATM cell stream.

When no line is being tested the system is essentially maintains multiple first current paths, each first current path being between an LT line and a respective copper wire between each UT card and at least one respective subscriber, to transfer an encoded ATM stream from each LT line to the at least one respective subscriber.

Subsequently, to test a subscriber line, the system opens a relay coupling a UT to an LT, essentially breaking one of the first current paths, and closes a relay coupling the UT to test access card 43, essentially making a second current path between external test head 160 and a subscriber line. For example, to test subscriber line 15, the system opens relay 203, essentially breaking a current path between line 15 and LT 52, and closes relay 233 and 173, essentially making a current path between external test head 160 and line 15, to transfer a test signal from test lead 160 to subscriber line 15.

Remaining relays in UT72, coupling UT72 to LT52, remain closed to maintain current paths between LT52 and other subscriber lines connected to UT72.

Figure 7:
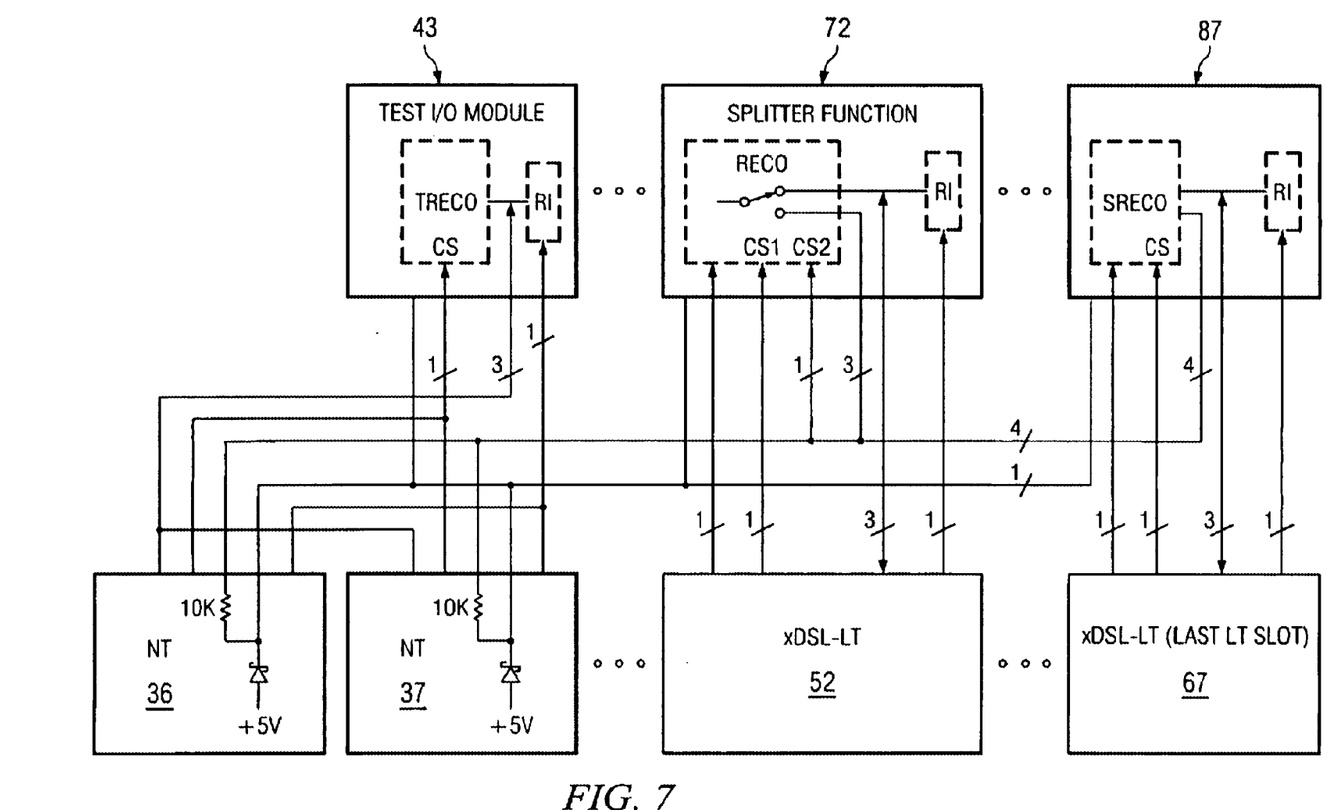
FIG. 7 is a diagram emphasizing other circuitry shown in FIG. 5.

FIG. 7 outlines some control interfaces among the NTs, the LTs, and the UTs in more detail. Relays of UT 72 are controlled by LT 52 via a micro-wire (u-wire) interface. Relays of the other UTs are controlled by their respective LT cards via a u-wire interface. Test access card 43 is controlled by a u-wire interface from NT 37 above which it is mounted, or is controlled by the active NT in redundant NT configurations. Spare switching card 87 is controlled by the u-wire interface from spare LT 67. In each case the u-wire also returns inventory information for the LT Ed to report (from the UT/Spare Switching Card). Relays are controlled from the u-wire interface via the devices labeled RECO/TRECO/SRECO located on the cards.

During spare line switching, the NT allows the u-wire interface of the spare LT to take over control of the UT associated with the faulty LT, via the device labeled RECO and the device labeled SRECO.

During the spare-switched mode, the remote inventory of the UT associated with the faulty LT cannot be read, as it is dependent on the LT-UT u-wire.

Power to the UTs/Spare line Switching/Test Access Cards is supplied from a diode "ORed" configuration from the NTs.

The external test head may effect several test suites among which may be mechanized loop test (MLT) type tests, load coil presence test and a golden LT, which is basically an ADSL LT with software to obtain access to line performance parameters. This golden LT would normally be connected to a golden ANT (modem) to assure quality of the LT, until a test routing is invoked. This is the expected test configuration for central offices In remote locations, a selected LT can be downloaded with golden software, and the external test connector can be wired to this LT (any slot in the shelf). As such, diagnosing faulty lines and subscriber modems can be done via this scenario, with results displayed on a network element manager screen.

Figure 8:
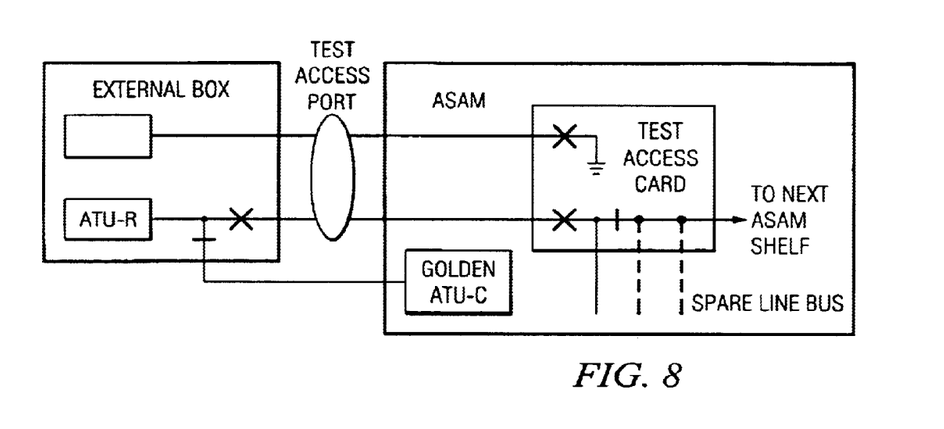
FIG. 8 is a diagram showing a configuration for testing.

As represented in FIG. 8, among the tests possibly run from test head 160 are MLT type test sequences, load coil detection tests, or a golden ATU-C function. golden ATU-C may be incorporated into the test head, being constantly monitored by a resident ATU-R, while switched to the test access port when needed to verify or diagnose subscriber faults.

Figures 9, 10:
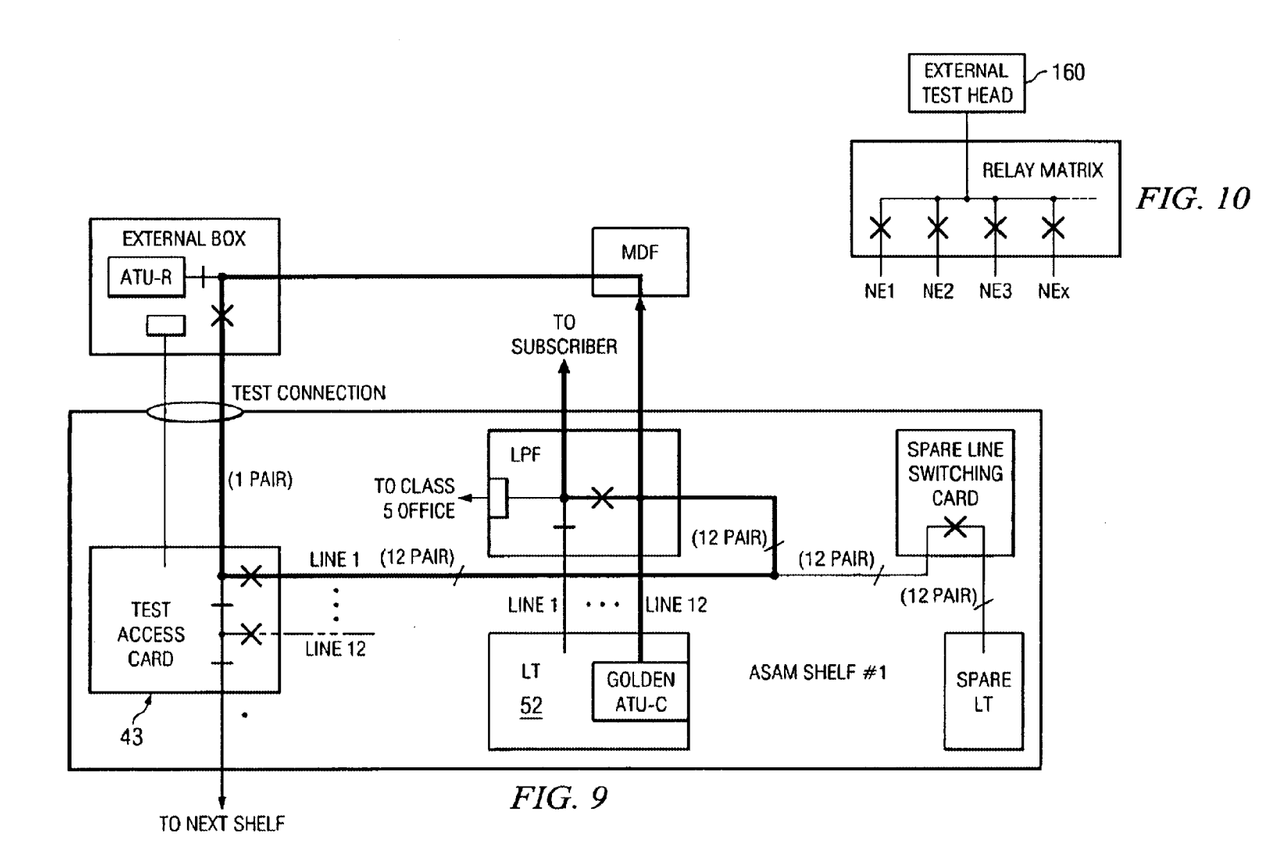
FIG. 9 is a diagram showing a configuration for testing.
FIG. 10 is a diagram showing a configuration for testing circuitry in multiple network elements using a common test head.

As represented in FIG. 9, it is possible to use the test access port in conjunction with a golden ATU-C function operating on one selected ADSL line. As such, the selected ATU-C line results would be displayed on the AWS, using the golden ATU-C presentation feature, thereby providing diagnostic/test capabilities integrated with the NE without the use of a test head. This would be especially valuable in a remote cabinet/CEV application where addition of a non-centralized test head would be expensive. In this case, the test access bus could be run to the external box, where an ATU-C would be normally connected to an ATU-R. Upon requesting a test scenario requiring this golden ATU-C, the ATU-C would be disconnected from the ATU-R and connected to the test access bus, which in turn has access to subscriber lines via the spare line bus.

The architecture described above supports multiple service types (ADSL, HDSL2, etc.) in the same NE. If only external test is required, a test access card is preferred for each shelf requiring test access. If only spare line switching is required, a spare line switching card and spare LT is preferred for each shelf requiring spare line switching. If both spare line switching and test access are required, both the spare line switching/spare LT cards and the test access card would be preferred on each shelf requiring these functions.

It is presently preferred that spare LTs be provided on a one per shelf basis, due to a possible performance degradation if the spare LT and UT of the faulty LT are separated by too much cabling and backplane stubs. This architecture can provide spare line switching to all LTs, or to only selected customers, based on the variant UT used, with or without the switching relays. This bus structure can be used by any DSL service, as long as the spare LT is of like service. Thus, it is presently preferred that different DSL services be dedicated on a per shelf basis.

Spare LT can be mounted anywhere in shelf 30, and can be optionally used as a spare line LT or normal LT, depending on whether the card slot above the spare LT is populated with a spare line switching card, or a normal UT.

For performance and contention reasons, it is presently preferred that test head not be daisy chained through more than one network element. Instead, the test head should contain a switching arrangement to address multiple network elements, each with its own "test connection complete" signal, as shown in FIG. 10.

The presence of more than one service (ADSL, HDSL2, etc.) resident in the NE, has no impact on the basic test access architecture. However, if spare line switching is required for 2 services, a spare line switching card and a spare LT of the second service type is preferred in the same shelf as the service. For this reason, it may be advantageous to keep services segregated on separate shelves.

The integrated test access feature described above is optimized for physical layer (layer I) DSL testing.

The test access and spare line switching features can be individually provided, or both provided, as desired by the service provider.

Thus, a central office employs DSL circuit cards. Each DSL circuit card encodes a digital signal using a discreet multitone technology (DMT) scheme, and sends an encoded signal on a subscriber line. A disclosed architecture allows the functions of a faulty DSL circuit card to be assumed by another card, without substantial disruption of subscriber service. Further, the architecture allows the faulty DSL to be physically replaced, with minimal disruption of subscriber service. Another aspect of the architecture allows for the testing of subscriber lines.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a system including a plurality of encoders each for receiving a digital signal to generate a respective encoded signal, a generator for generating a test signal, a plurality of cards each coupled to a respective conductor for sending signals to a respective subscriber, the method comprising the step, performed in each card, of maintaining a first current path between a respective encoder and the respective conductor, to transfer the encoded signal from the encoder to a respective subscriber, and the following subsequent steps, performed in one of the cards, of breaking the first current path;

making a second current path between the generator and the respective conductor, to transfer the test signal from the generator to the conductor, and the following step, performed currently with the two previous steps, in remaining ones of the cards, of maintaining the first current path between the respective encoder and the respective conductor, to transfer the respective encoded signal from the encoder to the respective subscriber; and connecting another encoder to the second current path.

2. A processing system for a first system having a plurality of conductors and a plurality of subscribers, the processing system comprising:

a plurality of encoders each for receiving a digital signal to generate a respective encoded signal;

a generator for generating a test signal;

a plurality of cards each coupled to a respective conductor for sending signals to a respective subscriber, each card including a current switch for maintaining a first current path between a respective encoder and the respective conductor, to transfer the encoded signal from the encoder to a respective subscriber, and for making a second current path between the generator and the respective conductor, to transfer the test signal from the generator to the conductor;

each current switch including a first current switch and a second current switch, said first current switch for maintaining the first current path and said second current switch for maintaining the second current path.

3. The processing system of claim 2 further including a current switch for connecting another encoder to the second current path.

4. The processing system of claim 2 wherein each current switch includes a mettalic relay.

5. A processing system for a first system having a plurality of conductors and a plurality of subscribers, the processing system comprising:

a plurality of encoders each for receiving a digital signal to generate a respective encoded signal;

a generator for generating a test signal;

a plurality of cards each coupled to a respective conductor for sending signals to a respective subscriber;

means, activatable for each card, for maintaining a first current path between a respective encoder and the respective conductor, to transfer the encoded signal from the encoder to a respective subscriber;

means for making, activated in one of the card, a second current path between the generator and the respective conductor, to transfer the test signal from the generator to the conductor;

means for connecting another encoder to the second current path; and means for maintaining, activated in remaining ones of the cards, the first current path between the respective encoder and the respective conductor, to transfer the respective encoded signal from the encoder to the respective subscriber.

* * * * *